(No Model.) 3 Sheets—Sheet 2.
J. P. BULLOCK.
RAISING AND LOWERING DEVICE FOR HARVESTERS.
No. 354,825. Patented Dec. 21, 1886.

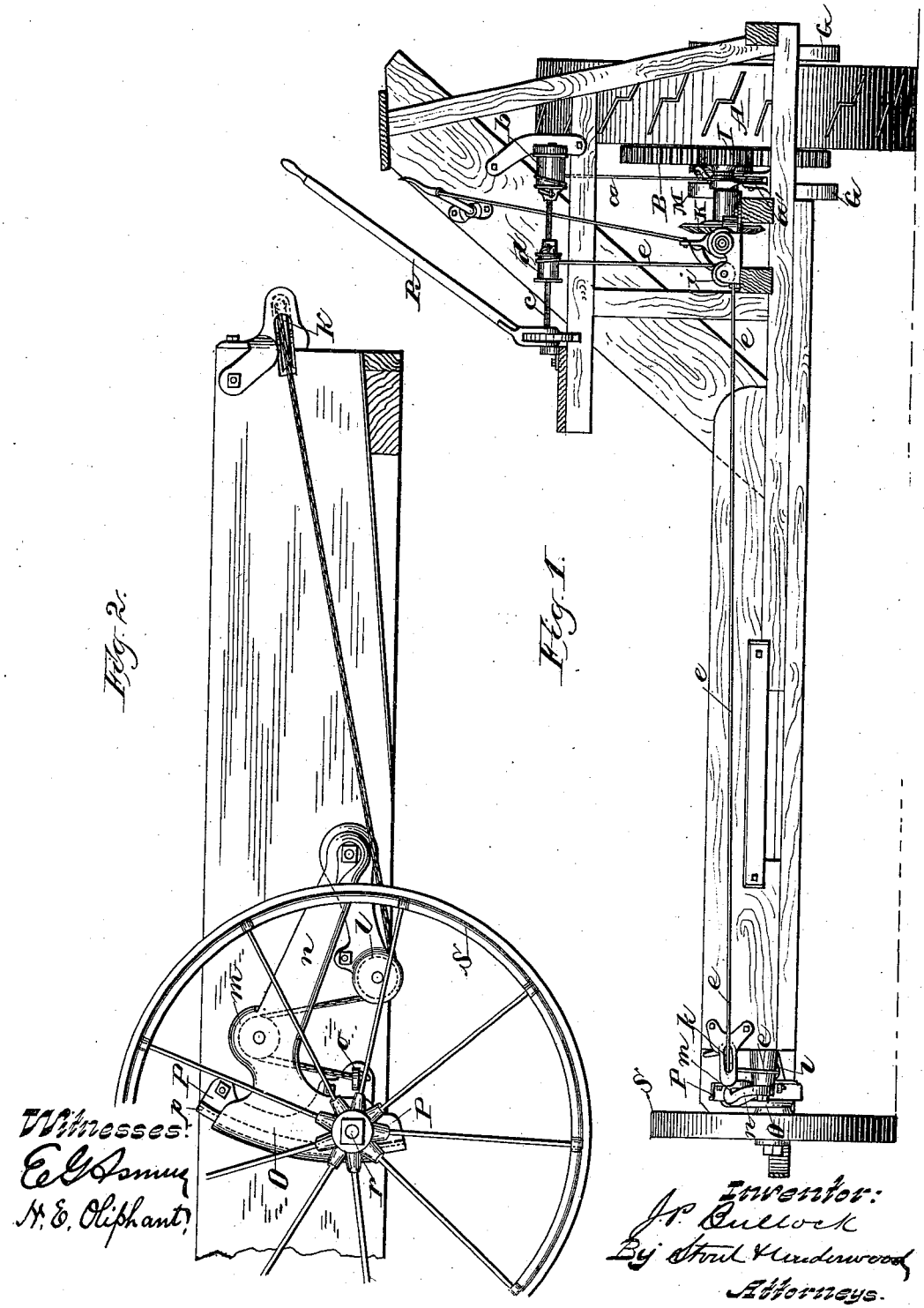

Witnesses:
E. G. James
N. E. Oliphant

Inventor:
J. P. Bullock
By Hunt & Underwood
Attorneys.

(No Model.) 3 Sheets—Sheet 3.

J. P. BULLOCK.
RAISING AND LOWERING DEVICE FOR HARVESTERS.

No. 354,825. Patented Dec. 21, 1886.

Witnesses:
E. G. Asmus
N. E. Oliphant

Inventor:
J. P. Bullock
By Stroud & Underwood
Attorneys.

UNITED STATES PATENT OFFICE.

JOSEPH P. BULLOCK, OF MILWAUKEE, WISCONSIN, ASSIGNOR TO THE MILWAUKEE HARVESTER COMPANY, OF SAME PLACE.

RAISING AND LOWERING DEVICE FOR HARVESTERS.

SPECIFICATION forming part of Letters Patent No. 354,825, dated December 21, 1886.

Application filed October 9, 1885. Serial No. 179,398. (No model.)

*To all whom it may concern:*

Be it known that I, JOSEPH P. BULLOCK, of Milwaukee, in the county of Milwaukee, and in the State of Wisconsin, have invented certain new and useful Improvements in Raising and Lowering Devices for Harvesters; and I do hereby declare that the following is a full, clear, and exact description thereof.

My invention relates to that class of harvesting-machines in which the main frame and platform are adjustable with relation to the main driving or bull wheel; and it consists in certain peculiarities of construction, whereby when the adjustment is secured the parts will be retained in their adjusted position independent of strain that may be caused by the weight or resistance of the grain; also by these peculiarities of construction the grain-wheel is always in line with the driving-wheel, so that both of these wheels and the entire machine may be turned upon the same pivotal center, as will be hereinafter more fully described with reference to the accompanying drawings, in which—

Figure 3:
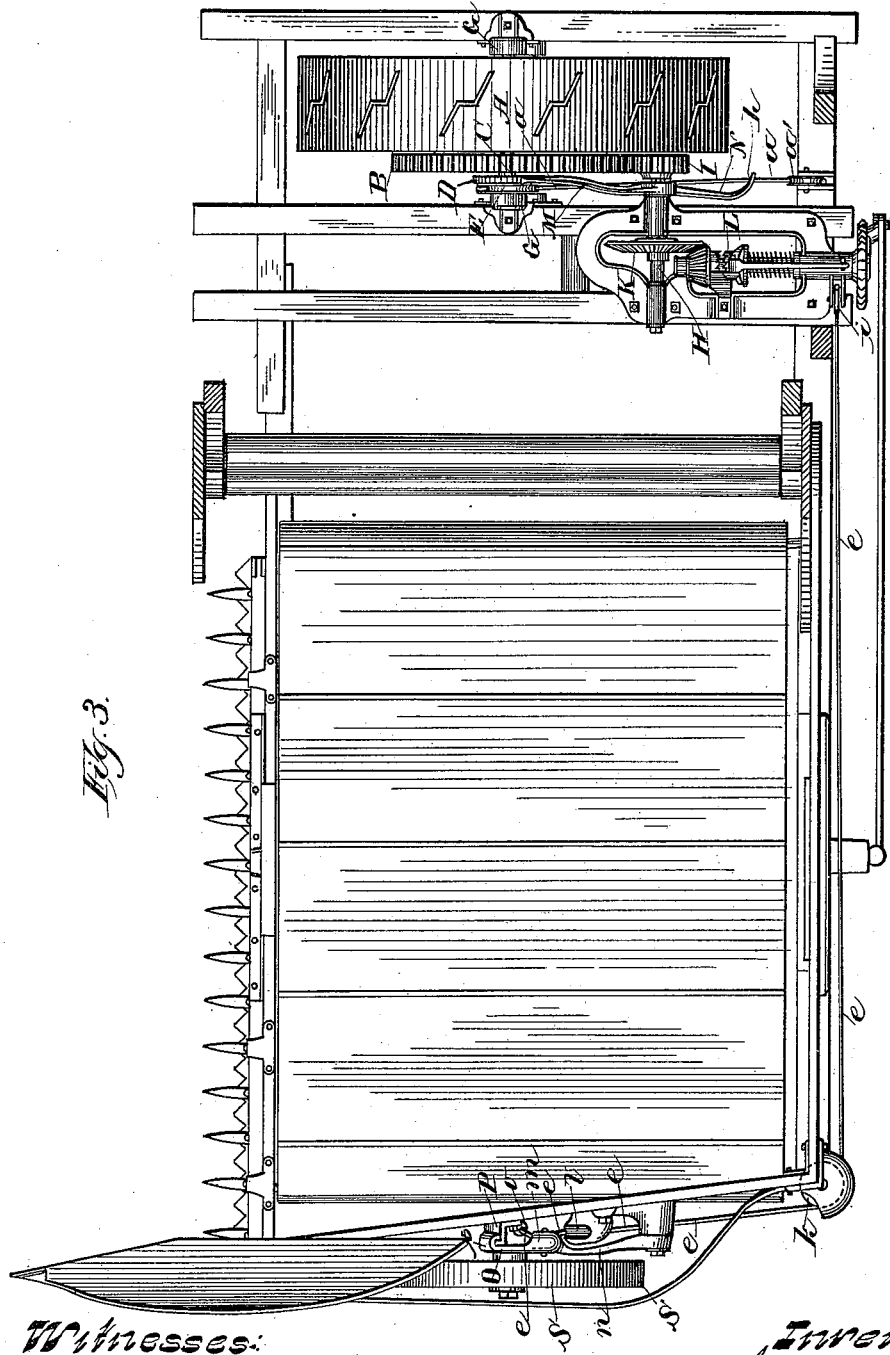
Figure 4:
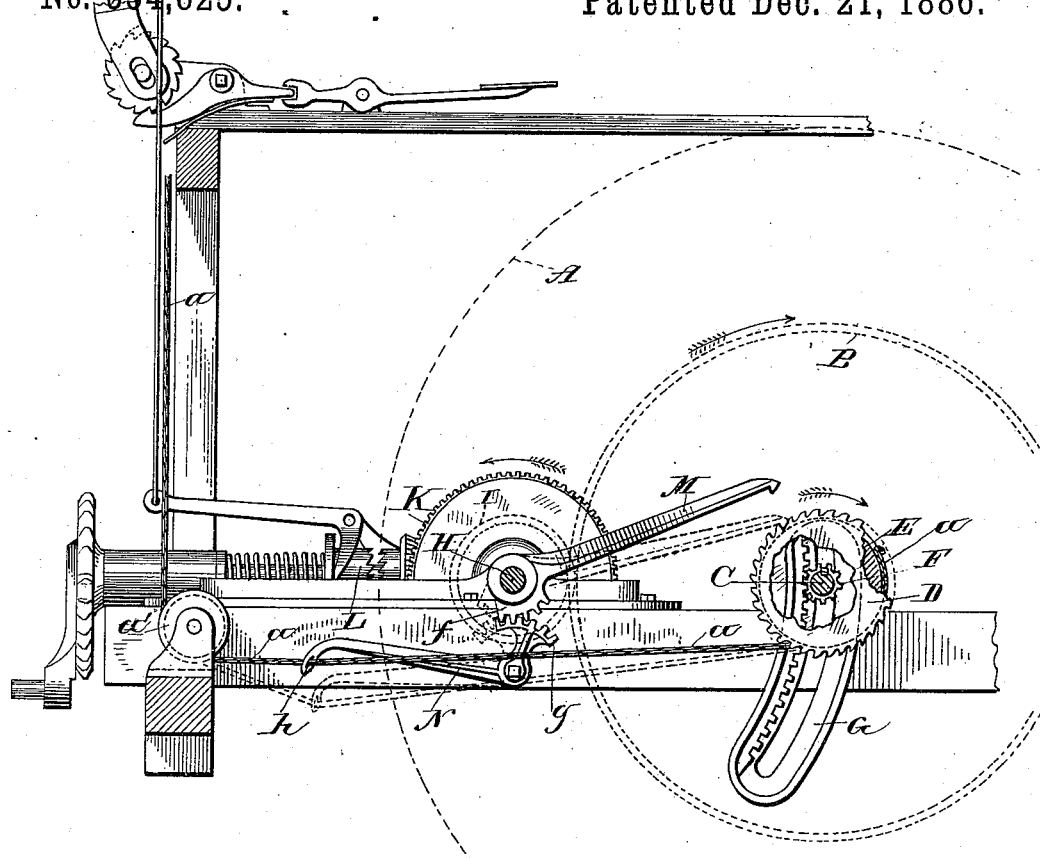

Figure 1 represents a rear elevation of a harvesting-machine embodying my improvements; Fig. 2, a side elevation of the grain side or end of the platform; Fig. 3, a top plan view of the platform, frame, and gearing, the upper portion of the frame being cut away, and Fig. 4 a side elevation of the draft side of the machine with the driving or bull wheel and main gearing in dotted lines.

A represents the main driving or bull wheel of a harvesting-machine, and B a main gear-wheel formed with or suitably secured to said driving or bull wheel, both of these wheels being loose upon a main shaft, C, journaled in bearings upon the harvester-frame.

Keyed to the main shaft C is a ratchet-wheel, D, pulley E, and pinion F, the latter meshing with a curved rack in a curved standard, G, secured to the driving side of the harvester-frame.

Secured to the pulley E is one end of a cord, $a$, which cord is passed under another pulley, $a'$, journaled in a bearing at the rear of the frame and thence to a spindle, $b$, upon a shaft, $c$, this shaft also carrying a spindle, $d$, having made fast thereto one end of the main adjusting-cord $e$.

Keyed to a shaft, H, is a pinion, I, which meshes with the main gear-wheel B, and through the medium of this pinion I motion is imparted to a bevel-gear mechanism, K, which in turn imparts motion to the cutting and other apparatus of the harvesting-machine, said bevel-gear being thrown in and out of mesh by a spring-clutch mechanism, L, operated by the driver of the harvester through a suitable lever system. Loosely journaled upon the shaft H just inside of the pinion I is a pawl, M, adapted to engage the ratchet-wheel D. The journal end of this pawl M is formed with a segment-rack, $f$, which meshes with a similar rack, $g$, of a guide-arm, N, said arm being pivotally connected to the harvester-frame and provided at its rear end with an eye, $h$, through which the cord $a$ passes. As the weight or resistance of the grain becomes so intense as to clog or entirely prevent the cutter from working, the pinion I in machines of the ordinary construction is prevented from turning and rides upon the main gear-wheel B, thus causing the curved standard G to rise upon the pinion F and elevate the harvester-frame from its adjusted position.

To prevent the harvester-frame from being elevated and thrown out of adjustment when the cutting apparatus does not operate freely, I journal the pawl M to the shaft I in such a position with relation to the ratchet-wheel D, keyed to the main shaft C, that the moment the pinion I begins to ride upon the main gear wheel B said pawl and ratchet-wheel will engage each other and thus prevent the main shaft from turning.

This operation is effected in the following manner: As the strain comes upon the gearing, the harvester-frame will be slightly raised and the pinion F be operated by the curved rack in the curved standard G. The rotation of the pinion F, which is keyed to the main shaft, will cause the pulley E, also keyed to said shaft, to partly unwind the cord $a$, made fast at one end to this pulley. The cord being passed through an eye, $h$, in the rear end of the guide-arm N, said arm is depressed by the weight of the cord as the latter slackens, and its segment-rack $g$ actuates the segment-rack on the pawl M, so as to bring said pawl into engagement with the ratchet-wheel D, also keyed to the main shaft, this entire operation being automatically and quickly effected, as is illustrated by dotted lines, Fig. 4. The main shaft being now securely locked, the curved rack-standard secured to the harvester-frame is prevented from working upon its pinion, and by the fact of the latter being held immovable this said frame is held in nearly the position to which it may have been originally adjusted, the variation being only sufficient to slacken the cord and of no material consequence. The harvester-frame being thus held and prevented from rising, the strain comes entirely on the pinion I, and has a tendency to force the rotation of said pinion to continue operating the cutting apparatus. When the strain is removed from the parts the pawl and ratchet will be automatically disengaged, as the weight of the harvester-frame causes the main shaft to revolve in a reverse direction to wind the cord $a$ upon its pulley E, thereby rotating the ratchet also in a reverse direction, and by the meshing and actuation of the segment-racks $f$ $g$ elevate the pawl M and cord-guide arm N. This operation being completed, the harvester-frame is in position to which it was originally adjusted, and, as before stated, its variation has at no time been of any material degree. The main adjusting-cord $e$, which is fast at one end to the spindle $d$ on the shaft $c$, extends down under a pulley, $i$, thence along the rear of the harvester-frame over a pulley, $k$, journaled in a suitable bearing secured to the corner of said frame at the point of juncture of its rear and grain sides. After the cord has passed the pulley $k$, it is carried along under a pulley in a bearing, $l$, secured to the grain side of the machine, thence up over another pulley in a bearing, $m$, formed in the rearwardly-extended arm $n$ of a curved standard, O, and then down and made fast in an eye, $o$, projecting from a flanged plate, P, bolted or otherwise suitably secured to said grain side of the machine.

When the ratchet-lever R is operated to adjust the harvester frame and platform, the main cord $e$ will be wound upon or let off from the spindle $d$, and the spindle $b$ on the same shaft $c$ with that of the spindle $d$ will be correspondingly actuated, so as to wind or unwind the cord $a$, and thereby always keep it taut with relation to said main cord $e$. The curved standard O is grooved upon its interior side, so as to engage the flange $p$ on the plate P, secured to the grain side of the harvester-frame, and upon which flange said grooved curved standard operates when the machine is being adjusted.

It will be noticed that the rearwardly-extended arm $n$ of the curved standard O is pivotally connected to the harvester-frame in line with the pinion I, and that the grain or carrying wheel S is journaled on a short shaft, $r$, extended from said curved standard O, in line with the main driving-wheel. By this construction I am enabled to turn the entire machine upon the same pivotal center.

Having thus fully described my invention, what I claim as new, and desire to secure by Letters Patent, is—

1. In a harvesting-machine, a mechanism to prevent the rising of the main frame and platform by reason of the resistance of the cutting apparatus, said mechanism consisting of a pulley and ratchet-wheel keyed to the main shaft of a harvesting-machine, a pawl loosely journaled on a shaft carrying a pinion arranged to mesh with a main gear-wheel, said pawl being adapted to engage and disengage the ratchet-wheel on the main shaft and provided at its journal end with a segment-rack, a guide-arm pivotally connected to a harvester-frame and provided with a segment-rack adapted to mesh with the segment-rack of the loosely-journaled pawl, and a suitable cord secured at one end to the main-shaft pulley, then to pass through an eye in the rear end of the guide-arm, thence under a pulley journaled in a bearing at the rear of the frame, and finally to be secured to a spindle on a shaft carrying another spindle for the main adjusting-cord of said harvesting-machine, substantially as and for the purpose set forth.

2. In a harvesting-machine, the combination, with a main shaft carrying a pinion adapted to engage and operate in a curved rack-standard on the driving side of said machine, of a pulley and ratchet-wheel keyed to the main shaft, a pawl loosely journaled on a shaft carrying a pinion arranged to mesh with a main gear-wheel loose on the main shaft, said pawl provided with a segment-rack at its journal end, a guide-arm also provided with a segment-rack at its forward end adapted to mesh with the segment-rack on the loosely-journaled pawl and formed at its rear end with an eye, and a suitable cord secured at one end to the pulley keyed to the main shaft, then passed through the eye in the guide-arm and thence under a suitably-arranged pulley in a bearing on the harvester-frame, and finally secured to a spindle on a shaft carrying a spindle for the main adjusting-cord, all arranged to operate substantially as and for the purpose set forth.

3. In a harvesting-machine, a curved standard having an internal groove, a short shaft for the grain-wheel, and a rearwardly-extended arm pivoted to the grain side of the machine and provided with a pulley, in combination with a flanged plate rigidly secured to said grain side of the machine to engage the groove in the standard, a pulley having its bearing also secured to the machine adjacent to the standard-arm, a cord fastened at one end to said standard and operatively arranged on the pulleys, and means for winding and unwinding the cord, substantially as and for the purpose set forth.

4. In a harvesting-machine, a mechanism for retaining the main frame and platform in the position to which they may be adjusted independent of resistance from the cutting apparatus, said mechanism consisting of a pulley and ratchet-wheel keyed to the main shaft, a pawl loosely journaled to a shaft carrying a pinion meshing with the main gear-wheel and provided at its journal end with a segment-rack, a guide-arm having in its rear end an eye and provided at its forward end with a segment-rack arranged to mesh with the segment-rack on the loose journaled pawl, and a suitable cord made fast at one end to the main-shaft pulley, then passed through the eye in the rear end of the guide-arm, thence under a pulley mounted in a bearing on the harvester-frame, and finally secured to a spindle on a shaft carrying the spindle for the main adjusting-cord, in combination with a curved standard having an interior groove, a short shaft for the grain-wheel, and a rearwardly-extended arm, the latter pivotally secured to the grain side of the harvester-frame in line with the driving-pinion arranged to mesh with the main gear-wheel, the grain-wheel journaled to the short shaft of the curved standard in line with the main driving-wheel, a main adjusting-cord passing over the pulley in the rearwardly-extended arm of said curved standard and secured to an eye on the face of the latter, and a flanged plate secured to the grain side of the harvester-frame and arranged to engage the groove in the curved standard, substantially as and for the purpose set forth.

In testimony that I claim the foregoing I have hereunto set my hand, at Milwaukee, in the county of Milwaukee and State of Wisconsin, in the presence of two witnesses.

JOSEPH P. BULLOCK.

Witnesses:
 S. S. STOUT,
 MAURICE F. FREAR.